(12) United States Patent
Suarez (10) Patent No.: US 11,825,829 B1
(45) Date of Patent: Nov. 28, 2023

(54) SAFE RELEASE FROG AND TOAD TRAP (71) Applicant: Suset Suarez, Homestead, FL (US)

(72) Inventor: Suset Suarez, Homestead, FL (US)

( * ) Notice: Subject to any disclaimer, the term of this patent is extended or adjusted under 35 U.S.C. 154(b) by 0 days.

(21) Appl. No.: 17/590,985

(22) Filed: Feb. 2, 2022

Related U.S. Application Data (60) Provisional application No. 63/149,110, filed on Feb. 12, 2021.

(51) Int. Cl.
*A01M 23/18* (2006.01)
*A01M 23/08* (2006.01)

(52) U.S. Cl.
CPC .......... *A01M 23/08* (2013.01); *A01M 23/18* (2013.01); *A01M 2200/00* (2013.01)

(58) Field of Classification Search
CPC ...... A01M 23/00; A01M 23/02; A01M 23/08; A01M 23/10; A01M 23/12; A01M 23/14; A01M 23/16; A01M 23/18; A01M 2200/00
USPC ...................................... 43/60, 61
See application file for complete search history.

(56) References Cited

U.S. PATENT DOCUMENTS

| | | | |
|---|---|---|---|
| 147,899 | A | 2/1874 | Carnahan |
| 1,226,288 | A | 5/1917 | White |
| 4,899,484 | A | 2/1990 | Morin |
| 5,778,594 | A | 7/1998 | Askins et al. |
| 6,029,392 | A | 2/2000 | Relf |
| 6,564,501 | B1 | 5/2003 | Schislyonok |
| 6,658,788 | B1 | 12/2003 | Steinfest |
| 6,684,560 | B2 | 2/2004 | Lafforthum |
| 7,026,942 | B2 | 4/2006 | Cristofori et al. |
| 7,540,109 | B2 | 6/2009 | Hall |
| 7,841,130 | B2 | 11/2010 | Blau |
| 7,866,086 | B2 | 1/2011 | Murchison |
| 8,336,251 | B2 | 12/2012 | Orchard |
| 8,418,396 | B2 | 4/2013 | Moustirats |
| 8,683,737 | B2 | 4/2014 | Studer et al. |
| 9,119,389 | B2 | 9/2015 | Perry et al. |
| 10,172,343 | B2 | 1/2019 | Radesky et al. |
| 2005/0097808 | A1 | 5/2005 | Vorhies et al. |
| 2015/0351378 | A1 | 12/2015 | Zero et al. |

FOREIGN PATENT DOCUMENTS

| | | | | | |
|---|---|---|---|---|---|
| AU | 2005203569 | A1 | * | 3/2007 | ............. A01M 23/16 |
| AU | 2007202705 | A1 | * | 1/2008 | ............. A01M 23/18 |
| KR | 20150109899 | A | * | 10/2015 | ............. A01M 23/16 |
| KR | 102182679 | B1 | * | 11/2020 | ............. A01M 23/02 |

* cited by examiner

*Primary Examiner* — Peter M Poon
*Assistant Examiner* — Danielle A Clerkley
(74) *Attorney, Agent, or Firm* — John Rizvi; John Rizvi, P.A.—The Patent Professor®

(57) ABSTRACT

There is provided a safe and humane trap for toads and frogs which is capable of easily releasing the captured amphibian into the wilds or into a collection bag. The trap generally includes a box having a movable trap door allowing the toad or frog to enter the trap and a separate release door for releasing the toad or frog from the trap. A release mechanism is provided to selectively lock and release the release door. At least one bag hook is provided on the trap to retain a collection bag over the release door.

19 Claims, 5 Drawing Sheets

SAFE RELEASE FROG AND TOAD TRAP

CROSS-REFERENCE TO RELATED APPLICATION

This application claims the benefit of U.S. Provisional Application 63/149,110, filed Feb. 12, 2021, which is hereby incorporated by reference herein in its entirety.

FIELD OF THE INVENTION

The present invention relates generally to live animal traps, and more particularly, to a safe release frog and toad trap for easy and harmless release or other disposition of a captured frog or toad into a collection bag.

BACKGROUND OF THE INVENTION

The trapping and capturing of frogs and toads may be desired for a variety of reasons. Often the presence of the toads and frogs may be a nuisance and unsightly when present on home patios and walkways. Alternatively, many people capture frogs for food as a delicacy.

Regardless of the reason for capturing the toads and frogs, many people do not like to use lethal traps which kill the toad or frog upon capture. It is often desirable to keep the frog and/or toad alive until it can be relocated or released. It may be, in some circumstances, further desirable to keep the frog and/or toad alive until it can be process for food. Thus, many people utilize so called "live traps" to capture and keep the toad or frog alive until it is dealt with.

Some types of frogs are highly toxic to humans and other animals. Many types of frogs, toads and other amphibians and reptiles are not native to this country and have proliferated causing damage to native fauna and flora. These non-native or "invasive species" of toads and frogs need to be removed to restore equilibrium to the local ecosystem. One such frog is a cane toad or bufo which is native to South Africa and has become a menace to the local ecosystems especially in areas such as south Florida, as well as other countries such as Australia, etc. These cane toads are highly toxic and can hurt people and animals and are thus very undesirable and need be removed in the interest of public health and safety. This in itself poses several problems, namely complying with local laws regarding the capture and destruction of invasive species and the ability to deal with highly toxic creatures.

In Florida, for example, it is not legal to outright kill these frogs on the spot. While the State wants them eradicated and does not want them released, it does want them captured alive and subsequently destroyed by, for example, euthanasia, specifically by the use of lidocaine and subsequent freezing of the creature.

Issues can arise when transferring a captured toxic toad or frog from a live trap into a container or collection bag for later processing. Handling the captured toxic frog exposes the user to direct toxins release by the creatures and, even with gloves on, latent toxins on the trap and capture bags.

Further, many live traps require both hands when deactivating the capture mechanism, are too large to operate with just one hand or have other issues preventing hand free release of the captured creature. This prevents the user from holding the container or bag in the proper position over the trap during release resulting in the escape of the toad or frog back into the same location.

Accordingly, there is need for a solution to at least one of the aforementioned problems. For instance, there is an established need for a live toad and frog trap that can safely and humanely capture the toads and frogs. There is a further established need for a live toad and frog trap that allows for hands free positioning of the container or collection bag about the trap during release.

SUMMARY OF THE INVENTION

The present invention is directed to a safe and humane trap for toads and frogs which is capable of easily releasing the captured amphibian into the wilds or into a collection bag. The trap generally includes a box having a movable trap door allowing the toad or frog to enter the trap and a separate release door for releasing the toad or frog from the trap. A release mechanism is provided to selectively lock and release the release door. At least one bag hook is provided on the trap to retain a collection bag over the release door.

In a first implementation of the invention, a safe release frog and toad trap is provided, the trap comprising:
- a box defining at least one side opening and at least one end opening,
- a first trap door pivotally mounted to said box and positioned over said at least one side opening, said first trap door movable between a closed condition blocking said at least one side opening and an open condition moving said first trap door away from said at least one side opening;
- a first release door pivotally mounted to said box and positioned over said at least one end opening, said first release door movable between a closed condition covering said at least one end opening and an open condition spaced away from said at least one end opening; and
- a release mechanism removably engagable with said first release door to secure said first release door in said closed condition.

In a second aspect, the release mechanism includes a first lock arm attached to the first release door and a release pin, insertable through a hole in the first lock arm to secure the first release door in a closed condition over the at least one end opening.

In another aspect, the release mechanism includes a second release door having a second lock arm, wherein the release pin is insertable through a hole in the second lock arm to secure the second release door in a closed condition.

In another aspect, the holes of the first and second lock arms are aligned for receipt of the release pin when the first and second release doors are in the closed condition.

In another aspect, the bag book includes a flat portion secured to the box and a protruding portion extending away from the box for receipt of a handle of a collection bag.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a live frog and toad t rap for the safe capture of frogs and toads and the harmless release of the captured frogs and toads from the trap into a collection bag.

Figure 1:
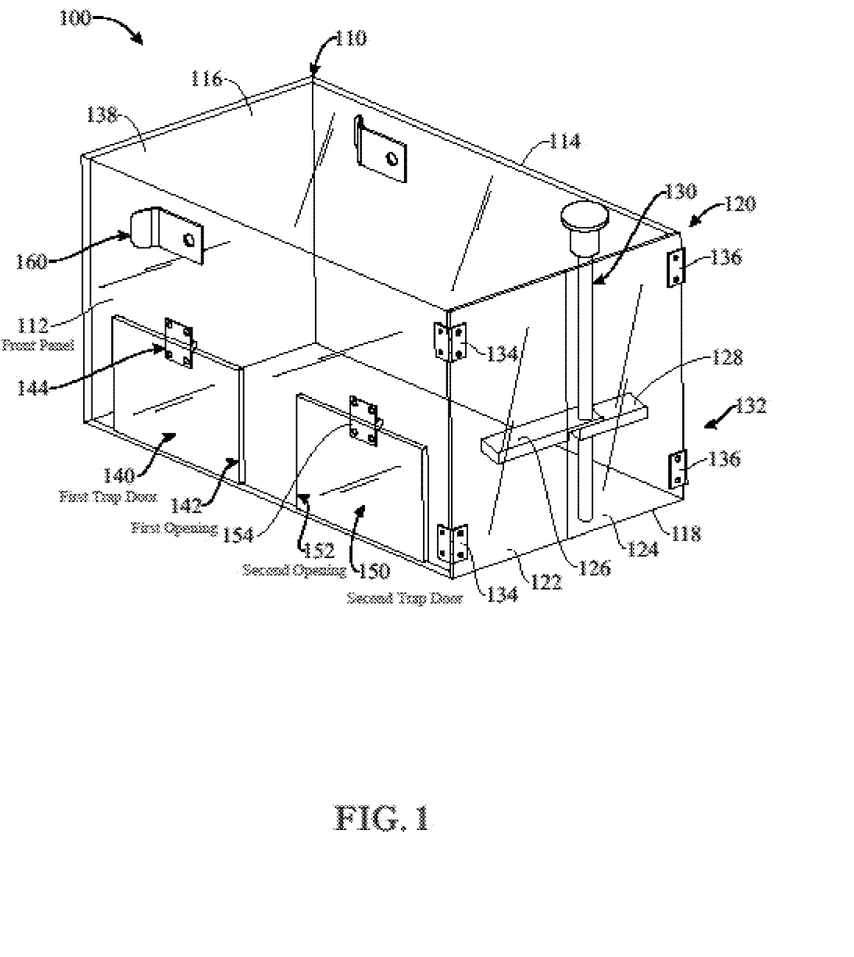
FIG. 1 presents top, front isometric view of a live frog and toad trap for safe and harmless release of a captured amphibian in accordance with an illustrative embodiment of the present invention.
Figure 2:
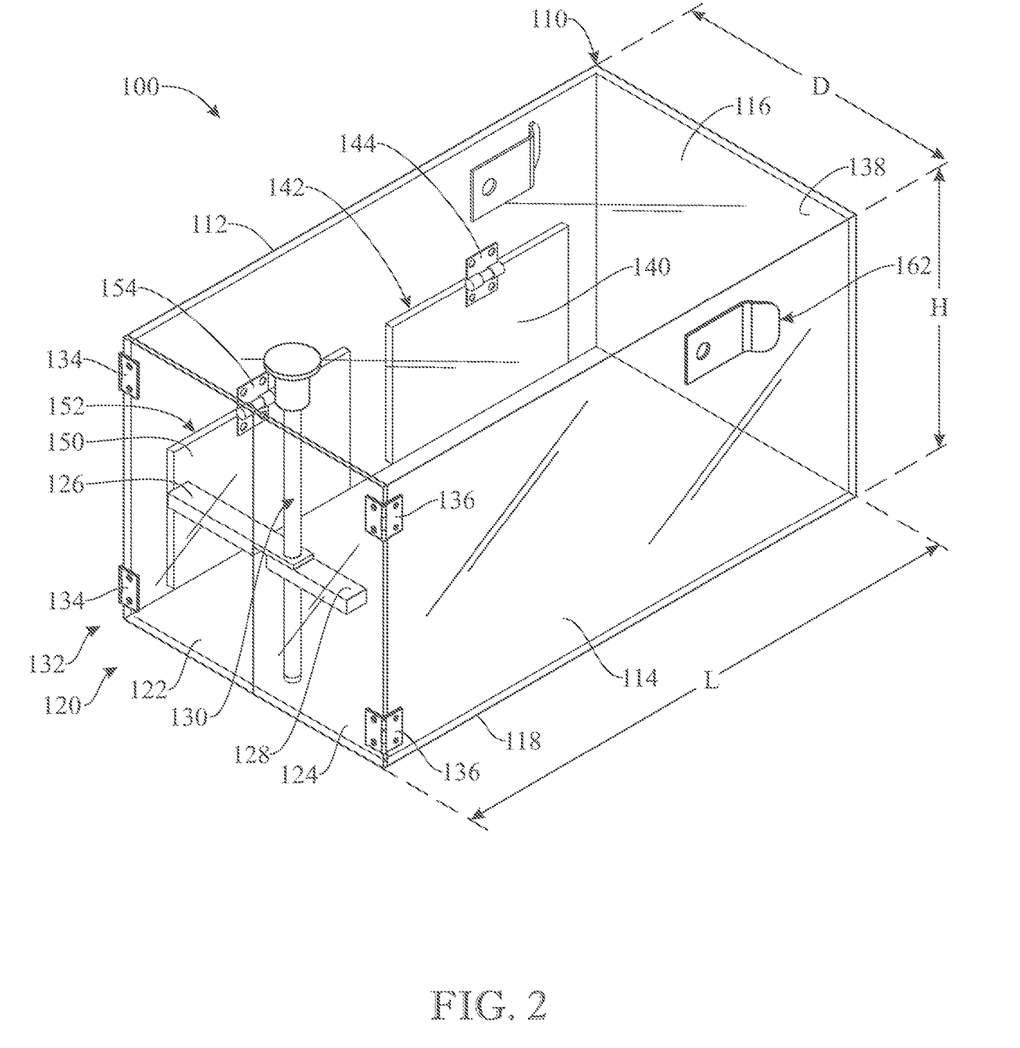
FIG. 2 presents top, rear isometric view the live frog and toad trap illustrated in FIG. 1.

Referring initially to FIGS. 1 and 2, a live frog and toad trap, hereinafter trap 100, is illustrated in accordance with an exemplary embodiment of the present invention. As shown, the trap 100 includes a generally rectangular box 110 having a front panel 112, a rear panel 114 and top and bottom panels 116 and 118, respectively. The trap 100 is provided to safely capture toads and frogs and easily and harmlessly deposit the captured toads and frogs into a container for transport, relocation and/or disposal. Thus, the trap 100 further includes a release mechanism 120 for quickly and easily releasing the captured toads and frogs into a container (not shown).

The release mechanism 120 includes a first release door 122 movably mounted to the box 110 and a second release door 124 movably mounted to the box 110. The first and second release doors 122 and 124 are movable between a closed condition retaining any captured toads and frogs within the box 110 and an open condition allowing the captured toads and frogs to be removed or released from the box 110. The release mechanism 120 further includes a first lock arm 126 mounted to the first release door 122, a second lock arm 128 mounted to the second release door 124 and a removable release bar or pin 130. The release pin 130 is releasably engagable with the first and second lock arm 126 and 128, respectively, in order to lock and unlock the first and second release doors 122 and 124 together.

The first and second release doors 122 and 124, respectively, form a first end panel 132 of the box 110. The first release door 122 is pivotally mounted to the front panel 112 by first release hinges 134 and the second release door 124 is pivotally mounted to the rear panel 114 by second release hinges 136. A second end panel 138, opposite the first end panel 132, completes the box 110. The first and second release hinges 134 and 136 may be unbiased hinges or may be spring biased such that the first and second release doors 122 and 124 are biased to the open condition to easily spring open upon removal of the release pin 130.

Figure 3:
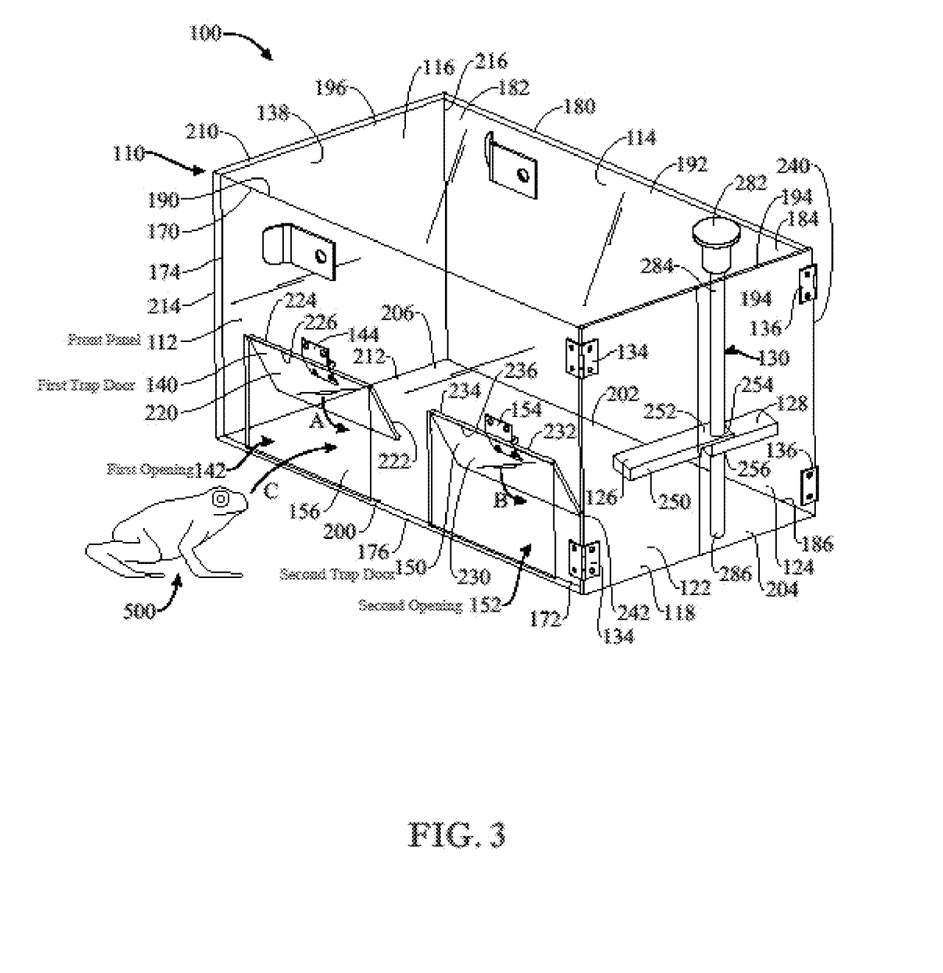
FIG. 3 presents an isometric view similar to FIG. 1, with a frog adjacent the trap prior to capture.

Turning now to FIGS. 1-3, in order to capture toads and frogs within the trap 100, the trap 100 further includes a first trap door 140 positioned in a cut out or first opening 142 formed in the front panel 112. The first trap door 140 is pivotally mounted to the front panel 112 by a first trap hinge 144. The first trap hinge 144 is mounted to the first trap door 140 and front panel 112 such that the first trap door 140 can only move or pivot into the box 110 to capture the toads and frogs and not outward such that the captured toads and frogs can pass back out of the box 110.

The trap 100 may further include additional trap doors such as, for example, a second trap door 150 which is positioned in a second opening 152 formed in the front panel 112 and is pivotally mounted thereto by a second trap hinge 154. The second trap hinge 154 functions identically to the first trap hinge 144 in that the second trap door 150 can only pivot inwardly relative to the box 100 to capture the toads and frogs in an interior 156 (FIG. 3) of the box 110. The first and second trap doors 140 and 150 are movable between an open condition allowing the toads and frogs to enter the interior 156 of the box 110 and a closed condition preventing the captured toads and frogs from escaping back out of the box 110 through the first and second trap openings 142 and 152, respectively.

Similar to the first and second release hinges 134 and 136 described hereinabove, the first and second trap hinges 144 and 154 may be spring biased such that the first and second trap doors 140 and 150, respectively, are biased to the closed condition to prevent any captured toads or frogs from escaping back out through the first and second trap doors 140 and 150.

While the disclosed trap 100 is illustrated and described with two trap doors, specifically the first trap door 140 and the second trap door 150 located in the front panel 112, it is contemplated that more or fewer trap doors may be provided across openings in the box 100. Additionally, the present disclosure is not limited to trap doors positioned in the front panel 112, but may include trap doors positioned in the rear panel 114 as well as the second end panel 138.

The disclosed trap 100 is provided to safely and easily capture toads and frogs and release the captured toads or frogs into a container or bag for easy transport, relocation and/or release. Thus, the trap 100 further includes tabs or hooks, such as, for example first and second bag hooks 160 and 162 mounted to the box 110 to temporarily hold or retain a bag around a portion of the box 110 to allow for a hands-free retention of the bag, such as, for example collection bag 400 (FIG. 5) while releasing the toads and frogs from the interior of the box 110. In the illustrated embodiment, the first bag hook 160 is mounted to the front panel 112 and the second bag hook 162 is mounted to the rear panel 114.

The trap 100 may be formed from a variety of organic or inorganic materials including plastics or polymers, metallic materials, wood, etc. In a preferred embodiment, all or part of the trap 100 is formed from a transparent plastic or polymeric material. By forming the trap from a transparent material, the user can easily see when a toad or frog has been trapped in the box 100. As best shown in FIG. 2, the trap has a length "L", a height "H" and a width or depth "D". In a preferred embodiment, the length L is longer than the depth D which is longer than the height H so as to form a low profile box 100.

Referring now to FIG. 3, the front panel 112 is formed from a section of transparent plastic and has a top edge 170, a first or right side edge 172, a second or left side edge 174 and a bottom edge 176. Likewise, the rear panel 114, the top panel 116, the bottom panel 118 and the second end panel 138 are also formed from a section of transparent plastic.

The rear panel 114 has a top edge 180, a first or left side edge 182, a second or right side edge 184 and a bottom edge 186. The top panel 116 has a front edge 190, a rear edge 192 and first and second or right and left side edges 194 and 196, respectively. The bottom panel 118 similarly includes a front edge 200, a rear edge 202 and first and second or right and left side edges 204 and 206, respectively. Finally, the second end panel 138 includes a top edge 210, a bottom edge 212, a front edge 214 and a rear edge 216.

The various adjacent edges of the front panel 112, the rear panel 114, the top panel 116, the bottom panel 118 and the second end panel 138 may be joined in a variety of ways. For example, the adjacent edges of the disclosed panels may be joined by mechanical fastening such as, for example, nailing, screwing, bolting, etc. Alternatively, the various panels may be attached or affixed together by gluing, fusing or melting, welding, etc. depending on the nature of the materials forming the various disclosed panels.

The first and second release doors 122 and 124 as well as the first and second trap doors 140 and 150 may also be formed from a variety of materials and, in a preferred embodiment, are also formed of a transparent polymeric material. In construction, the first and second trap doors 140 and 150 may be cut out of the sheet of material forming the front panel 112 to create not only the first and second trap doors 140 and 150 but also the first and second trap openings 142 and 152. The first and second release doors 122 and 124 may be cut from a single sheet of material forming the first end panel 132.

The first trap door 140 has an outer face 220 and an inner face 222. The outer face 220 may be treated or formed such that it is not harmful to any toad or frog that pushes against it to access the interior 156 of the box 110. The first trap hinge 144 is affixed to a top edge 224 of the first trap door 140 and a top edge 226 of the first trap opening 142. As noted hereinabove, the first trap opening 142 is a cut out formed in the front panel 112.

Likewise, the second trap door 150 has a similar outer face 230 and an inner face 232. The second trap hinge 154 is affixed to a top edge 234 of the second trap door 150 and a top edge 236 of the second trap opening 152. As noted hereinabove, the first and second trap hinges 144 and 154 are preferably spring biased to hold the first and second trap doors 140 and 150, respectively, in the closed condition. Alternatively, the weights of the first and second trap doors 140 and 150 may be used to maintain the doors in a fully down position i.e., in the closed condition. Still further, while not specifically shown the first and second trap doors 140 and 150 may be formed slightly larger than the first and second trap openings 142 and 152 and positioned within the interior 156 of the box 110 such that the first and second trap doors 140 and 150 cannot swing outward to release any trapped toads or frogs.

As noted above, the release mechanism 120 includes the first and second release doors 122 and 124. The second release door 124 includes a right side edge 240 which is pivotally connected to the second or right side edge 184 of the rear panel 114 by the second release hinges 136. Similarly, the first release door 122 includes a left side edge 242 which is pivotally connected to the first or right side edge 172 of the front panel 112 by the first release hinges 134.

The release mechanism 120 is provided to hold the trapped toads and frogs in the interior 156 of the box 110 until release by the operator or user. The first lock arm 126 and the second lock arm 128, along with the release pin 130 hold the first and second release doors 122 and 124 in the closed condition until the release pin 130 is removed.

Figure 5:
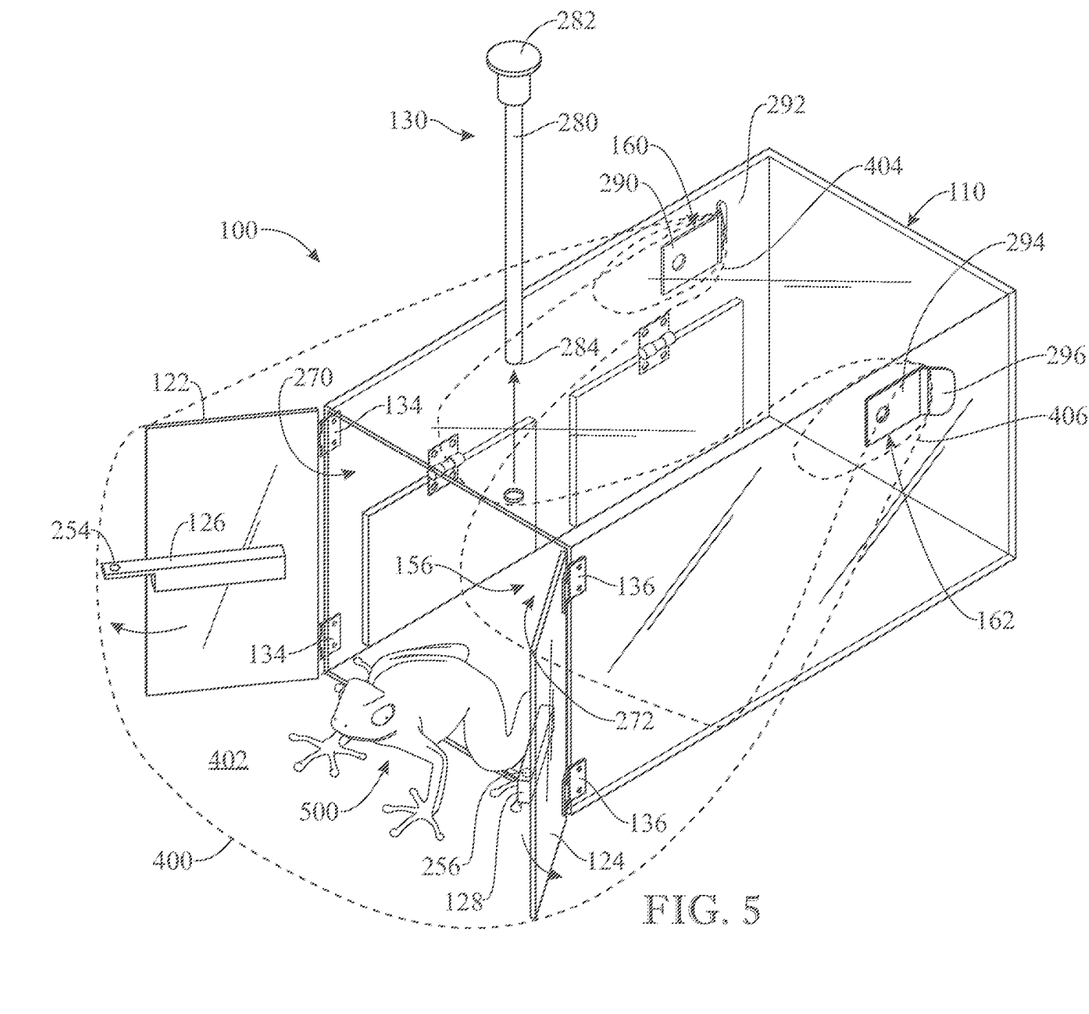
FIG. 5 presents a top, front isometric view of the live frog and toad trap of FIG. 1 with a release mechanism of the disclosed live frog and toad trap activated to discharge the live frog from the live frog and toad trap.

The first lock arm 126 includes a thick section 250 and a thin section 252 extending from the thick section 250. The thin section 252 defines a lock hole 254 which corresponds to a lock hole 256 formed through an end portion 258 of the second lock arm 128. The thin section 250 of the first lock arm 126 overlaps the end portion 258 of the second lock arm 128 to align the lock holes 254 and 256 for receipt of the release pin 130. When the first and second lock arms 126 and 128 are in alignment, the release pin 130 is positioned through the first and second lock holes 254 and 256 to secure the first and second release doors 122 and 124 in the closed condition securing any toads or frogs trapped and contained in the interior 156 of the box 110. When the first and second release doors 122 and 124 are in the unlocked and open condition, the first release door 122 defines a first release door opening 270 in the first end panel 132 and the second release door 124 defines a second release door opening 272 in the first end panel 132 (FIG. 5).

The release pin 130 includes an elongate shaft 280 and a knob or handle 282 at a first end 284 of the shaft 280. The handle 282 is provided to facilitate release of the elongate shaft 280 from the first and second lock arms 126 and 128. A second end 286 of the shaft 280 of the release pin is sized so as to fit through the first and second lock holes 254 and 256 in the first and second lock arms 126 and 128, respectively.

In use, the user places bait, such as, for example, insects, etc. inside the box 110 of the trap 100. The first and second release doors 122 and 124 are secured in the closed condition with the release pin 130 inserted through the first and second lock arms 126 and 128, respectively. The trap 100 is then positioned in a location, such as, for example, a patio, a lawn area, walkways, etc. where the toads and frogs are known to frequent or where they have become a nuisance.

Figure 4:
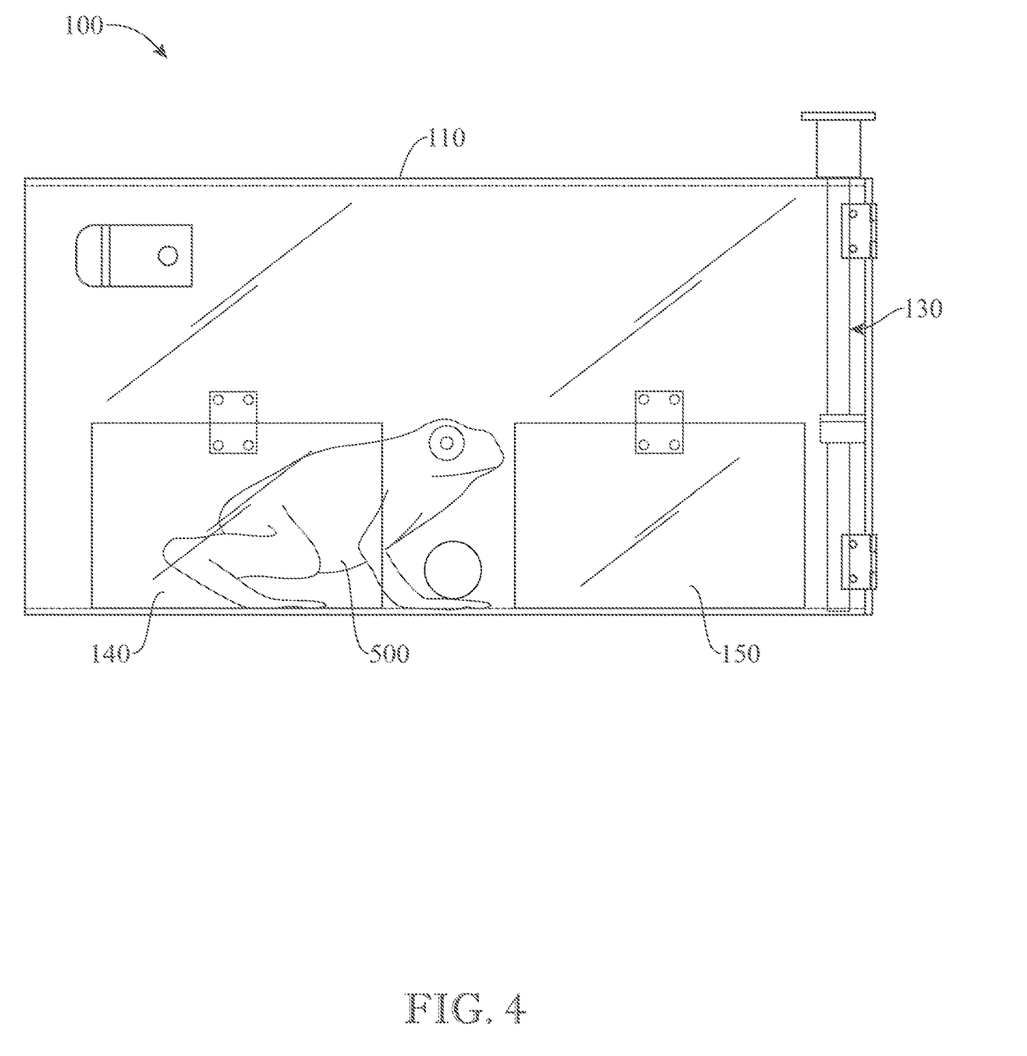
FIG. 4 presents a front elevation view of the live frog and toad trap illustrated in FIG. 1, with a live frog captured therein.

As best shown in FIG. 3, a toad or frog 500 is attracted to the interior 156 of the box 110 by the bait (not shown). The frog 500 pushes the first or second trap doors 140 or 150 inwardly in the direction of arrows "A" or "B" respectively to access the interior 156 of the trap 100. The frog 500 then jumps in the direction of arrows "C" into the box 100 pushing past the pivotal first or second trap doors 140 or 150. Once the frog 500 has reached the interior 156 of the box 110, the respective first or second trap door 140 or 150 pivots back to the closed condition cutting off the first or second trap door openings 142 or 152 blocking any escape. Thus, the frog 500 is securely trapped within the trap 100 (FIG. 4).

Referring now to FIG. 5, when it comes time to release the frog 500 from the trap 100, the user will decide if she or he wishes to simply release and/or relocate the frog 500 or capture the frog 500 in a container such as, for example, a collection bag 400. As noted hereinabove, the trap 100 is provided with first and second bag hooks 160 and 162 for hands free retention of a collection bag 400 over the first and second release doors 122 and 124 and thus over the first and second release openings 270 and 272.

The first bag hook 160 includes a flat portion 290 secured to the front panel 112 and a protruding portion 292 extending from the flat portion 290 and separated away from the front panel 112. Likewise, the second bag hook 162 includes a flat portion 294 secured to the rear panel 114 and a protruding portion 296 extending from the flat portion 294 and separated away from the rear panel 114.

The collection bag 400 includes an interior 402 for receipt of the frog 500 and first and second handles 404 and 406, respectively. The collection bag 400 is placed over the first and second release doors 122 and 124. The first handle 404 of the collection bag 400 is releasably secured to the protruding portion 292 of the first bag hook 160 and the second handle 406 of the collection bag 400 is secured to the protruding portion 296 of the second bag hook 162.

To release the frog 500 from the trap 100 generally or to release the frog 500 into the collection bag 400, the user pulls up on the handle 282 of the release pin 130 to draw the shaft 280 of the release pin 130 out of the lock holes 254 and 256 in the first and second lock arms 126 and 128. Once the first and second lock arms 126 and 128, and thus the first and second release doors 122 and 124, have been unlocked by the removal of the release pin 130, the first and second release doors 122 and 124 can be moved to the open condition by the bias of the spring biased first and second release hinges 134 and 136. In the absence of any springs in the first and second release hinges 134 and 136, the box 110 can be turned such that gravity pulls the first and second release doors 122 and 124 to the open condition. By incorporating the externally actable release pin 130 into the release mechanism 120, the user or operator can release the creatures from the trap 100 in a hands free manner, i.e., without the need to handle or come close to the captured creatures.

Once the first and second release doors 122 and 124 have been moved to the open condition, the frog 500 can be placed in the interior 402 of the collection bag 400 either on its own accord trying to escape the interior 156 of the box 110 or by shaking the box 110 until the frog 500 drops or falls into the collection bag 400. Thereafter, the first and second handles 404 and 406 of the collection bag 400 are removed from the first and second bag hooks 160 and 162 and the frog 500 transported in the collection bag 400 for relocation, use or disposal as desired. It should be noted that at no time is the user or operator of the live frog and toad trap 100 exposed to the frog or toads captured therein and is not exposed to any toxins or diseases they have during both capture and release.

Thus, the disclosed toad and frog trap 100 provides a novel, safe and hands free means of safely and humanely trapping and moving toads and frogs.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A safe release frog and toad trap comprising:
a box comprising at least one end opening, a first end panel, a second end panel, a front panel comprising a first opening, and a rear panel, wherein the first end panel is opposite the second end panel, and the front panel is opposite the rear panel;
a first trap door pivotally mounted to the box and positioned over the first opening formed in the front panel, the first trap door movable between a closed condition blocking the first opening and an open condition moving the first trap door away from the first opening;
a first release door pivotally mounted to the box and positioned over the at least one end opening, the first release door movable between a closed condition covering the at least one end opening and an open condition spaced away from the at least one end opening;
a second release door pivotally mounted to the box and positioned over the at least one end opening, the second release door movable between a closed condition covering the at least one end opening and an open condition spaced away from the at least one end opening, wherein the first release door and the second release door form the first end panel; and
a release mechanism removably engageable with the first release door and the second release door to secure the first release door and the second release door in the closed condition; wherein the release mechanism further comprises:
a release pin;
a first lock arm attached to the first release door, the release pin being insertable through a first lock hole in the first lock arm to secure the first release door in the closed condition over the at least one end opening; and
a second lock arm attached to the second release door, the release pin being insertable through a second lock hole in the second lock arm to secure the second release door in the closed condition over the at least one end opening, wherein the first and second lock holes of the first and second lock arms are aligned for receipt of the release pin when the first and second release doors are in the closed condition thereby securing the first and second release doors in the closed position.

2. The safe release frog and toad trap of claim 1, wherein the safe release frog and toad trap further comprises:
a second trap door pivotally mounted to the box and positioned over a second opening formed in the front panel, the second trap door movable between a closed condition blocking the second opening and an open condition moving the second trap door away from the second opening.

3. The safe release frog and toad trap of claim 1, wherein the safe release frog and toad trap further comprises:
a first trap hinge for pivotally mounting the first trap door to the front panel such that the first trap door can only move or pivot into the box to capture toads and frogs.

4. The safe release frog and toad trap of claim 2, wherein the safe release frog and toad trap further comprising:
a first trap hinge for pivotally mounting the first trap door to the front panel such that the first trap door can only move or pivot into the box to capture toads and frogs; and
a second trap hinge for pivotally mounting the second trap door to the front panel such that the second trap door can only move or pivot into the box to capture the toads and frogs.

5. The safe release frog and toad trap of claim 1, wherein the safe release frog and toad trap further comprises:
a first bag hook and a second bag hook, each of which is mounted to the box for holding or retaining a bag around a portion of the box.

6. The safe release frog and toad trap of claim 5, wherein the first bag hook is mounted to the front panel and the second bag hook is mounted to the rear panel.

7. The safe release frog and toad trap of claim 1, wherein the first release door is pivotally mounted to the front panel by first release hinges and the second release door is pivotally mounted to the rear panel by second release hinges.

8. The safe release frog and toad trap of claim 7, wherein the first and second release hinges are spring biased such that the first and second release doors are biased in an open condition to easily spring open upon a removal of the release pin.

9. The safe release frog and toad trap of claim 1, wherein all or substantially all of the trap is formed from a transparent plastic or polymeric material.

10. The safe release frog and toad trap of claim 1, wherein the trap has a length (L), a height (H), and a depth (D) such that the length is longer than the depth which is longer than the height so as to form a low profile.

11. The safe release frog and toad trap of claim 1, wherein the first trap door further comprises an outer face and an inner face, wherein the outer face is treated or formed to avoid harming any toad or frog that pushes against the first trap door in accessing an interior of the box.

12. The safe release frog and toad trap of claim 1, wherein the first end panel, the second end panel, the front panel and the rear panel are joined together by a plurality of mechanical fasteners.

13. The safe release frog and toad trap of claim 2, wherein the first opening and the second opening are each a respective cut out formed in the front panel of the box.

14. The safe release frog and toad trap of claim 1, wherein the release pin further comprises an elongated shaft comprising a first end and a second end, and a knob or handle affixed at the first end of the elongated shaft for use in releasing the elongated shaft from the first and second lock arms, and wherein the second end of the elongated shaft is sized to fit through the first and second lock holes in the first and second lock arms, respectively.

15. A safe release frog and toad trap comprising:
a box comprising at least one end opening, a first end panel, a second end panel, a front panel comprising a first opening, and a rear panel, wherein the first end panel is opposite the second end panel, and the front panel is opposite the rear panel;
a first trap door pivotally mounted to the box and positioned over the first opening formed in the front panel, the first trap door movable between a closed condition blocking the first opening and an open condition moving the first trap door away from the first opening;
a first release door pivotally mounted to the box and positioned over the at least one end opening, the first release door movable between a closed condition covering the at least one end opening and an open condition spaced away from the at least one end opening;
a second release door pivotally mounted to the box and positioned over the at least one end opening, the second release door movable between a closed condition covering the at least one end opening and an open condition spaced away from the at least one end opening;
a release pin comprising an elongated shaft comprising a first end and a second end, and a knob or handle affixed at the first end of the elongated shaft;
a first lock arm attached to the first release door, the release pin being insertable through a first lock hole in the first lock arm to secure the first release door in the closed condition over the at least one end opening;
a second lock arm attached to the second release door, the release pin being insertable through a second lock hole in the second lock arm to secure the second release door in the closed condition over the at least one end opening, wherein the first and second lock holes of the first and second lock arms are aligned for receipt of the release pin when the first and second release doors are in the closed condition thereby securing the first and second release doors in the closed position, and wherein the knob or handle affixed at the first end of the elongated shaft is used for releasing the elongated shaft from the first and second lock arms, and the second end of the elongated shaft is sized to fit through the first and second lock holes in the first and second lock arms, respectively; and
a release mechanism removably engageable with the first release door and the second release door to secure the first release door and the second release door in the closed condition.

16. The safe release frog and toad trap of claim 15, wherein the safe release frog and toad trap further comprises:
a second trap door pivotally mounted to the box and positioned over a second opening formed in the front panel, the second trap door movable between a closed condition blocking the second opening and an open condition moving the second trap door away from the second opening.

17. The safe release frog and toad trap of claim 16, wherein the first opening and the second opening are each a respective cut out formed in the front panel of the box.

18. A safe release frog and toad trap comprising:
a box comprising at least one end opening, a first end panel, a second end panel, a front panel comprising a first opening, and a rear panel, wherein the first end panel is opposite the second end panel, and the front panel is opposite the rear panel, wherein the first end panel, the second end panel, the front panel and the rear panel are joined together by a plurality of mechanical fasteners;
a first trap door pivotally mounted to the box and positioned over the first opening formed in the front panel, the first trap door movable between a closed condition blocking the first opening and an open condition moving the first trap door away from the first opening, wherein the first trap door further comprises an outer face and an inner face, wherein the outer face is treated or formed to avoid harming any toad or frog that pushes against the first trap door in accessing an interior of the box;
a first release door pivotally mounted to the box and positioned over the at least one end opening, the first release door movable between a closed condition covering the at least one end opening and an open condition spaced away from the at least one end opening;
a second trap door pivotally mounted to the box and positioned over a second opening formed in the front panel, the second trap door movable between a closed condition blocking the second opening and an open condition moving the second trap door away from the second opening, wherein the first opening and the second opening are each a respective cut out formed in the front panel of the box, wherein the second trap door further comprises an outer face and an inner face, wherein the outer face is treated or formed to avoid harming any toad or frog that pushes against the second trap door in accessing an interior of the box;

a second release door pivotally mounted to the box and positioned over the at least one end opening, the second release door movable between a closed condition covering the at least one end opening and an open condition spaced away from the at least one end opening, wherein the first release door and the second release door form the first end panel, wherein the first release door and the second release door form the first end panel and the first release door is pivotally mounted to the front panel by first release hinges and the second release door is pivotally mounted to the rear panel by second release hinges;

a release pin comprising an elongated shaft comprising a first end and a second end, and a knob or handle affixed at the first end of the elongated shaft;

a first lock arm attached to the first release door, the release pin being insertable through a first lock hole in the first lock arm to secure the first release door in the closed condition over the at least one end opening;

a second lock arm attached to the second release door, the release pin being insertable through a second lock hole in the second lock arm to secure the second release door in the closed condition over the at least one end opening, wherein the first and second lock holes of the first and second lock arms are aligned for receipt of the release pin when the first and second release doors are in the closed condition thereby securing the first and second release doors in the closed position, and wherein the knob or handle affixed at the first end of the elongated shaft is used for releasing the elongated shaft from the first and second lock arms, and the second end of the elongated shaft is sized to fit through the first and second lock holes in the first and second lock arms, respectively;

a first bag hook and a second bag hook, each of which is mounted to the box for holding or retaining a bag around a portion of the box; and a release mechanism removably engageable with the first release door and the second release door to secure the first release door and the second release door in the closed condition.

19. The safe release frog and toad trap of claim 18, wherein the trap has a length (L), a height (H), and a depth (D) such that the length is longer than the depth which is longer than the height so as to form a low profile, and all or substantially all of the trap is formed from a transparent plastic or polymeric material.

* * * * *